(12) United States Patent
Larue et al.

(10) Patent No.: US 9,341,645 B2
(45) Date of Patent: May 17, 2016

(54) SYSTEM AND METHOD FOR REAL-TIME DETERMINATION OF A REPETITIVE MOVEMENT PARAMETER

(75) Inventors: Anthony Larue, Chaville (FR); Frédéric Suard, Versailles (FR)

(73) Assignees: Commissariat A L'energie Atomique et Aux Energies Alternatives, Paris (FR); Movea, Grenoble (FR)

( * ) Notice: Subject to any disclaimer, the term of this patent is extended or adjusted under 35 U.S.C. 154(b) by 817 days.

(21) Appl. No.: 13/578,539

(22) PCT Filed: Feb. 10, 2011

(86) PCT No.: PCT/EP2011/051961
§ 371 (c)(1),
(2), (4) Date: Nov. 28, 2012

(87) PCT Pub. No.: WO2011/098521
PCT Pub. Date: Aug. 18, 2011

(65) Prior Publication Data
US 2013/0073249 A1    Mar. 21, 2013

(30) Foreign Application Priority Data
Feb. 10, 2010    (FR) .................................... 10 50913

(51) Int. Cl.
*G01P 21/00* (2006.01)
*G06K 9/00* (2006.01)
*G06F 15/00* (2006.01)

(52) U.S. Cl.
CPC ............... *G01P 21/00* (2013.01); *G06F 15/00* (2013.01); *G06K 9/00348* (2013.01); *A63F 2300/105* (2013.01); *A63F 2300/6045* (2013.01)

(58) Field of Classification Search
CPC ..... G06F 15/00; G01P 21/00; G06K 9/00348; A63F 2300/105; A63F 2300/6045
USPC .............. 702/141; 463/1, 6, 9, 49; 703/11, 20
See application file for complete search history.

(56) References Cited

U.S. PATENT DOCUMENTS

| 6,686,716 B1 * | 2/2004 | Predina et al. | 318/560 |
| 7,293,235 B1 * | 11/2007 | Powers et al. | 715/706 |
| 8,892,345 B2 * | 11/2014 | Arcot et al. | 701/119 |

(Continued)

OTHER PUBLICATIONS

Gafurov D et al.; "Gait Recognition Using Acceleration from MEMS", The First International Conference on Vienna, Austria, Apr. 2006, pp. 432-439.

(Continued)

*Primary Examiner* — Carol S Tsai
(74) *Attorney, Agent, or Firm* — Stroock & Stroock & Lavan LLP

(57) ABSTRACT

A system for real-time determination of a parameter of a movement having a repetitive form includes first estimating means for estimating an approximation of the period of the repetitive movement, before the end of the current movement, on the basis of representative signals indicative of the movement. A determining means determines a size of a sliding window on the basis of the period estimated by the first estimating means. Finally, a second estimating means precisely estimates, using the sliding window, the movement parameter, on the basis of the representative signals indicative of the movement and of the size of the sliding window delivered by the first estimating means.

15 Claims, 6 Drawing Sheets

(56) References Cited

U.S. PATENT DOCUMENTS

2006/0262857 A1* 11/2006 Iwasaki et al. ........... 375/240.19
2013/0246121 A1* 9/2013 Houle et al. ................ 705/7.31

OTHER PUBLICATIONS

S Sprager, D Zazula: "A Cumulant-Based Method for Gait Identification Using Accelerometer Data . . . ", WSEAS Transactions on Signal Processing, vol. 11, Nov. 2009, pp. 389-378.

Moe-Nilseen R et al: "Estimation of gait cycle characteristics by trunk accelerometry", Journal of Biomechanics, Pergamon Press, vol. 37, No. 1, Jan. 2004, pp. 121-126.

Jianyi Liu et al.: "Partitioning Gait Cycles Adaptive to Fluctuating Periods and Bad Silhouettes", Aug. 27, 2007, Advances in Biometrics, pp. 347-355.

Li, D. and Jung, R.; "Tracking rhythmicity in nonstationary quasi-periodic biomedical signals . . . ", Computers in Biology and Medicine, vol. 32, No. 4, 2002, pp. 261-282.

Chris H L Peters et al.; "Beat-to-beat detection of fetal heart rate: Doppler . . . ", Physiological measurement, institute of physics publishing, Apr. 1, 2004, pp. 585-593.

L.R. Rabiner: "On the use of autocorrelation analysis for pitch detection", IEEE Transactions on acoustics, Speech & Signal Processing, vol. 25, No. 1, Feb. 1, 1977, p. 24-33.

Nakatani et al.: "A method for fundamental frequency estimation . . . ", Speech communication, Elsevier Science Publishers, Amsterdam NL, Jan. 29, 2008, pp. 203-214.

International Search Report and Written Opinion issued in corresponding International Application No. PCT/EP2011/051961, dated Jul. 5, 2011.

Liu et al., 2007, "Partitioning Gait Cycles Adaptive to Fluctuating Periods and Bad Silhouettes", Institute of AI & Robotics, Xi an Jiaotong University, China, LNCS 4642, pp. 347-355.

Gafurov et al., 2006, "Gait Recognition Using Acceleration from MEMS", Proceedings of the First International Conference on Availability, Reliability and Security.

* cited by examiner

SYSTEM AND METHOD FOR REAL-TIME DETERMINATION OF A REPETITIVE MOVEMENT PARAMETER

CROSS-REFERENCE TO RELATED APPLICATIONS

This application is a national phase application under 35 U.S.C. §371 of PCT/EP2011/051961, filed Feb. 10, 2011, which claims priority to French Patent Application No. 1050913, filed Feb. 10, 2010, the entire contents of which both of these applications are expressly incorporated herein by reference.

BACKGROUND OF THE INVENTION

Field of the Invention

The invention pertains to a system and a method for real-time determination of a parameter of a movement of repetitive form.

The term real-time signifies that the response time is adapted to the context of the application.

Various embodiments of the present invention apply to any sector in which a movement of repetitive form takes place, such as the medical sector, rehabilitation, the sports sector, but applies particularly well to the video games sector, in which numerous games require movements of repetitive form on the part of the player. The various embodiments can also apply to movements of repetitive form of an automaton or robot.

The analysis of human movements is implemented in various sectors such as cinema, video games, and sport. This analysis makes it possible, for example, to be able to reproduce the movements performed by a user, so as to animate a virtual depiction of a person displayed on a screen, without having to recreate a complex physical model, while retaining more natural and spontaneous body actions.

The capture of movement is used principally for cinema and video games so as to animate avatars or virtual depictions of people on a display screen, by reproducing the real movements, such as is described for example in the document WO 2008011352.

However, such systems require the use of specific markers disposed on each limb of the user, combined with video acquisition centered on the person. The video is thereafter analyzed so as to define a model by determining, in three dimensions, the location of each marker.

This technique involves a complex implementation since the constraints on the precision of the movements performed and the location of the markers are significant. Moreover the acquisition of the data and their processing are not necessarily performed in real time since this principally entails reproducing the movements and not interacting in real time with a system.

Other schemes, such as that disclosed in the document WO 2006103662, allow the tracking of sports events. This application makes it possible to control a set of cameras in such a way as to improve their orientation according to the phases of sports actions taking place, or to be able to perform a summary of the phases of sports actions that have occurred. However, the cameras often being far from the sportsmen, the former cannot be used in applications requiring high precision.

In the case of interactions between a user and a machine, for example a video games console, there exist other schemes currently under development which allow interaction between the player and the games console. Recently, project Natal from Microsoft (trademark) has been presented. It is aimed at proposing a new interface using a video camera which interprets the movements performed by the user so as to drive a video game or multimedia interface.

However, this technique constrains the user to act in a determined space requiring notably the absence of any obstacle between the user and the system.

Other systems use onboard sensors, or, stated otherwise, the user is equipped with sensors, such as a satellite location system sensor, making it possible to give his location or position, or with sensors making it possible to determine his movements, such as an accelerometer, a magnetometer, or a gyrometer. In certain embodiments, the sensors are minimally intrusive and easily positionable without outside intervention.

Such sensors, even low cost ones, make it possible to obtain better precision in the measurement of movements than a video sensor where the precision is proportional to the size and definition of the sensor and therefore requires more complex processing and a more efficacious and more expensive processing machine.

Onboard sensors may be used for geolocation and guidance. Certain vehicles or apparatuses equipped with satellite location system receivers, such as GPS receivers, also contain an inertial rig so as to alleviate temporary cutoffs of reception of the signals of the system. Such a system has thus been adapted for the guidance of pedestrians, as described in the document US 2009192708. These approaches require, however, a global position reference, the movement sensors may be used only in a temporary manner so as to alleviate a consequent defect or else to enhance precision. The systems used involve very few sensors, a simple accelerometer makes it possible to give the principal direction and the speed of the displacement, and no additional details are necessary to characterize the movement. Moreover, it is not necessary to respond as quickly as possible upon a change of speed or direction. Such systems are not adapted for relatively precise movements, nor for the use of an interface.

In various embodiments of the present invention, the user interacts with a machine solely by virtue of the movement sensors. This approach therefore requires high precision, but above all the earliest possible response and simple and natural handling.

The use of sensors fixed to a person so as to control a communication interface has expanded over recent years.

In particular in the context of video games where certain systems make it possible to interact in a more precise manner than with a stick or a keyboard, but also to afford user-friendliness by enabling the uninitiated to play rapidly without learning to master controls, those linked to movements being more natural. Finally, this approach affords improved realism by adapting the video game to the player's own movements.

Thus, Sony has proposed a dualshock (trademark) stick compatible with its game console comprising a movement sensor, so that the movements applied to the console can be transcribed to the screen. However, the movements are limited and the principal functionality therefore remains the possibility of amplifying the directional movements as a function of the inclination of the stick.

More recently, Nintendo has introduced its mass-market Wii (trademark) console which comprises interactive sticks. These sticks are furnished with an accelerometer which is used to ascertain the movement of the player, but without more precisely determining the direction or the amplitude of the movement. To supplement this stick, a platform is developed so as to also consider the movements of the legs, such as described in document EP 0908701. However, this platform only makes it possible to ascertain the frequency of leg movements at the same location and does not therefore tolerate any displacement of the player. Moreover, it does not make it possible to ascertain the orientation of the player so as to be able, for example, to perform a rotation command.

Document WO 2006086487 relates to the adaptation of a module to a sports shoe so as to measure and transmit the information regarding the quantity of movements performed. The particular feature of this invention resides in the capacity to measure the quantity of physical activity performed by the player so as to be able to activate certain functionalities of the game, or certain characteristics of the avatar or virtual depiction. However, this device does not allow complete interfacing between a player and his virtual depiction. Indeed, only one sensor is used, for example an accelerometer, to measure the physical activity, but no information is recovered for more precisely characterizing the movements performed.

These systems lack precision and speediness for real-time applications, notably in the video games sector.

BRIEF SUMMARY OF THE INVENTION

An aim of various embodiments of the invention is to alleviate the problems cited above.

According various embodiments of the invention, there is proposed a system for real-time determination of a parameter of a movement of repetitive form comprising:
  first means for estimating an approximation of the period of said movement of repetitive form, before the end of the current movement, on the basis of representative signals indicative of said movement;
  means for determining a size of sliding window on the basis of said period estimated by said first estimating means; and
  second means for precisely estimating, by sliding window, said movement parameter, on the basis of representative signals indicative of said movement and of said size of sliding window delivered by said first estimating means.

The real-time determination is thus improved, since the first means for estimating an approximation of the period of the movement of repetitive form, before the end of the movement in progress, allows the determining means to estimate speedily, in an adaptive manner, a size of sliding window particularly adapted to the precise calculation of the movement parameter in a rapid manner. The size of the sliding window is thus automatically adapted to the variation in the period of the movement of repetitive form. The expression movement of repetitive form is intended to mean a movement of relatively similar form, but some of the parameters of which may vary, such as the period (or frequency or speed), the amplitude, or the impact (power of a contact shock).

In various embodiments, said movement parameter is the period of said movement of repetitive form.

The system is particularly adapted for precisely estimating, in real time, the period of the movement of repetitive form, on the basis of a first approximate rapid estimation making it possible to rapidly determine a size of sliding window particularly adapted to a precise calculation of the period, which is thus performed much more rapidly. Hence, the determination of the period of the movement of repetitive form is thus performed precisely with a improved earliest possible response time, i.e. an improved real-time aspect.

For example, said second estimating means comprise correlation-based means for calculating the period of the movement of repetitive form.

Thus, on the basis of not very complex statistics, it is possible to determine the parameter without a priori knowledge of the temporal signature of the movement.

According to some embodiments, said first means for estimating another movement parameter of said movement of repetitive form, different from said period, comprise said second means for precisely estimating said period.

If the period of the movement of repetitive form is determined with a system according to various embodiments of the invention, in real time, in a precise manner, said period may be used to calculate another movement parameter, different from the period, according to another aspect of various embodiments of the invention, by serving to determine a size of sliding window, thereafter allowing precise and rapid estimation of this other movement parameter.

In various embodiments, said determining means comprise a multiplicative enhancement of safety.

A safety margin is thus taken for the determination of the size of the sliding window, thereby making it possible to prevent the size of the sliding window from being a little too small.

According to various embodiments, the system comprises a communication interface for communicating in real time the evolution of said movement, for example, an audiovisual interface.

Such an audiovisual communication interface is particularly well adapted for video games systems.

In various embodiments, the system comprises, furthermore, a sensor assembly adapted for being fixed to the element performing the movement of repetitive form, so as to deliver said signals.

The sensor assembly can comprise at least one magnetometer, and/or at least one accelerometer, and/or a gyrometer, and/or a pressure sensor, and/or an electrocardiograph, and/or a flowmeter for measuring the amount of breath, and/or a sensor for measuring the frequency of respiration.

According to another aspect there is also proposed a method for real-time determination of a parameter of a movement of repetitive form comprising the steps consisting in:
  estimating an approximation of the period of said movement of repetitive form, before the end of the current movement, on the basis of representative signals indicative of said movement;
  determining a size of sliding window on the basis of said approximately estimated period; and
  estimating precisely, by sliding window, said movement parameter, on the basis of representative signals indicative of said movement and of said determined size of sliding window.

According to one mode of implementation, the precise period of said movement of repetitive form is determined in real time.

In one mode of implementation, the estimation of another movement parameter of said movement of repetitive form, different from said period, uses in the step of approximately estimating said period, the step of precisely estimating the period of said movement of repetitive form.

According to one mode of implementation, said signals are transmitted by a sensor assembly fixed to the element performing the movement of repetitive form, comprising, for example, at least one magnetometer, and/or at least one accelerometer, and/or a gyrometer, and/or a pressure sensor, and/or an electrocardiograph, and/or a flowmeter for measuring the amount of breath, and/or a sensor for measuring the frequency of respiration.

In various embodiments, a change of frame of said signals transmitted by the sensor assembly furnished with a first orthonormal frame [X, Y, Z] is performed by using a decomposition into decreasing eigenvalues $\lambda_u$, $\lambda_v$ and $\lambda_w$ to express said first orthonormal frame [X, Y, Z] in a second orthonormal frame [U, V, W], whose axis U or whose axes U and V correspond respectively to a principal axis or a principal plane of said movement.

Precision and robustness are thus improved. Furthermore, automatic calibration of the sensor assembly is then possible.

According to various embodiments, said determination in real time of the precise period of said movement of repetitive form detects local maxima and a global maximum, over said sliding window, said local and global maxima being multiples of an elementary duration, and selects the maximum, corresponding to said precise period, occurring earliest and whose deviation with respect to said global maximum is less than a threshold.

The low risk of error in the detection of said precise period is thus still more limited over the size of the sliding window already optimized by virtue of the rapid approximate estimation of the period.

BRIEF DESCRIPTION OF THE DRAWINGS

The invention will be better understood on studying certain embodiments, described by way of wholly non-limiting examples, and illustrated by the appended drawings in which.

DETAILED DESCRIPTION OF THE INVENTION

In the various figures, the elements having identical references are identical.

Figure 1:
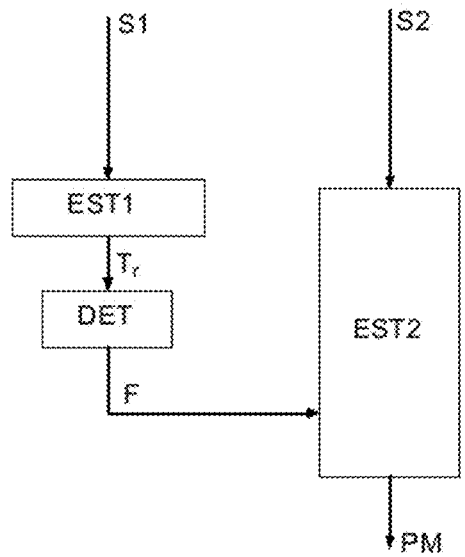
FIG. 1 schematically illustrates a system for real-time determination of a parameter of a movement of repetitive form, according to one aspect of various embodiments of the invention.

In FIG. 1 is illustrated an example of a system for real-time determination of a parameter of a movement of repetitive form, comprising a first estimation module EST1 for estimating an approximation Tr of the period of the movement of repetitive form, before the end of the current movement, on the basis of signals S1, S2 representative of the movement. A determination module DET determines a size F of sliding window on the basis of said period Tr estimated by the first estimation module EST1, for example by multiplying the rapid approximation Tr by a factor or gain equal to 1+Δ, so as to take a safety margin. Δ can for example lie between 0 and 0.5. A second module for precise estimation, by sliding window, of the movement parameter, on the basis of the signals S1, S2 representative of the movement and of the size F of sliding window delivered by the first estimation module EST1.

Figure 2:
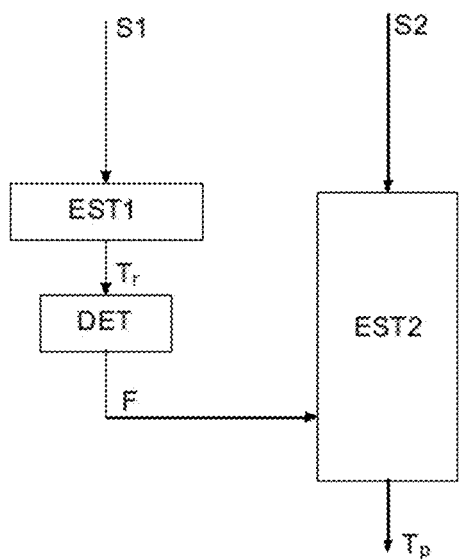
FIG. 2 schematically illustrates an exemplary embodiment of a system of FIG. 1, in which the parameter is the period according to various embodiments of the invention.

FIG. 2 illustrates a case in which the movement parameter determined in real time in a movement of repetitive form is the period of the movement, which is delivered as output Tp by the second estimation module EST2.

In this case, various embodiments of the invention make it possible, through the rapid estimation, generally before the end of the movement in progress, of the period of the movement Tr, to provide the second module for precise estimation with a size F of sliding window which is optimized, by way of the determination module DET, thereby allowing the second estimation module EST2 to perform, at the earliest possible moment, a precise estimation Tp of said period. This precise estimation is much more rapid.

In the case of the calculation of the period, the second estimation module EST2 performs a correlation by sliding window on the basis of a single signal or of several signals, which may or may not comprise the input signals of the first estimation module EST1.

Figure 3:
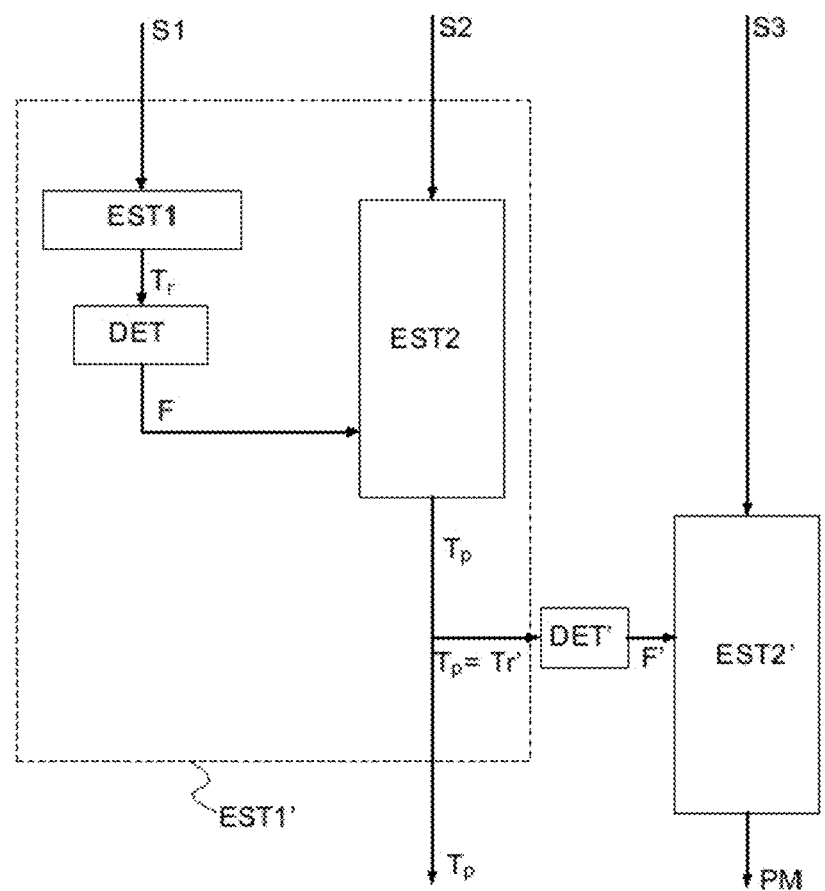
FIG. 3 schematically illustrates a system of FIG. 2 furthermore estimating another movement parameter of said movement of repetitive form, different from said period, according to various embodiments of the invention.

FIG. 3 illustrates an embodiment "in cascade", according to various embodiments of the invention, for which the system of FIG. 2 is employed, and serves as first rapid estimation module EST'1, for estimating a size of sliding window for precisely estimating another movement parameter which right away makes it possible to take as rapid estimation Tr' of the period, directly the precise period Tp already calculated in a precise manner.

The module for rapid estimation EST1 of the period can, for example, implement rapid estimations described in the document "Frequency tracking in nonstationary signals using Joint Order Statistics", Proceedings of the International Symposium on Time-Frequency and Time-Scale Analysis 96, p 441-444, by A. Marakov, in "Un nouvel outil d'analyse temps-frequence base sur un moyennage à recalage de phase" [A new time-frequency analysis tool based on averaging with phase registration] Gretsi 2009, by M. Jabloun, or in "Adaptive spectrogram vs. Adaptive pseudo Wigner-Ville distribution for instantaneous frequency estimation", Signal Processing 2003, by S. Chandra Sekhar.

The signals S1, S2, or S3 may be identical, different, or one may include another. They originate from sensors transmitting signals representative of a movement of repetitive form. For example, a sensor assembly can comprise at least one magnetometer, and/or at least one accelerometer, and/or a gyrometer, and/or a pressure sensor, and/or an electrocardiograph, and/or a flowmeter for measuring the amount of breath, and/or a sensor for measuring the frequency of respiration.

Figure 4:
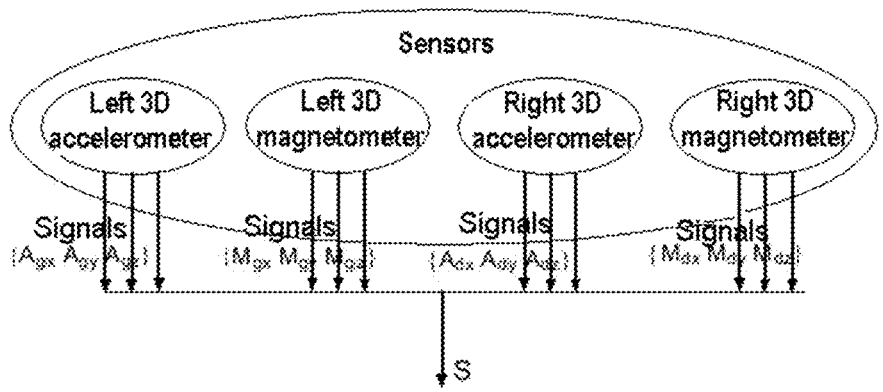
FIGS. 4 and 5 schematically illustrate a sensor assembly in the case of a video game application.

FIG. 4 illustrates an example in which various embodiments of the invention are applied to the video games sector in respect of walking movements of repetitive form. The sensor assembly comprises, for each leg, a triaxial accelerometer and a triaxial magnetometer (X, Y and Z). Each modality is a three-dimensional signal, in this instance twelve signals in total. These signals are sampled at regular intervals, and each signal received is dated so as to be able to synchronize the data.

Figure 5:
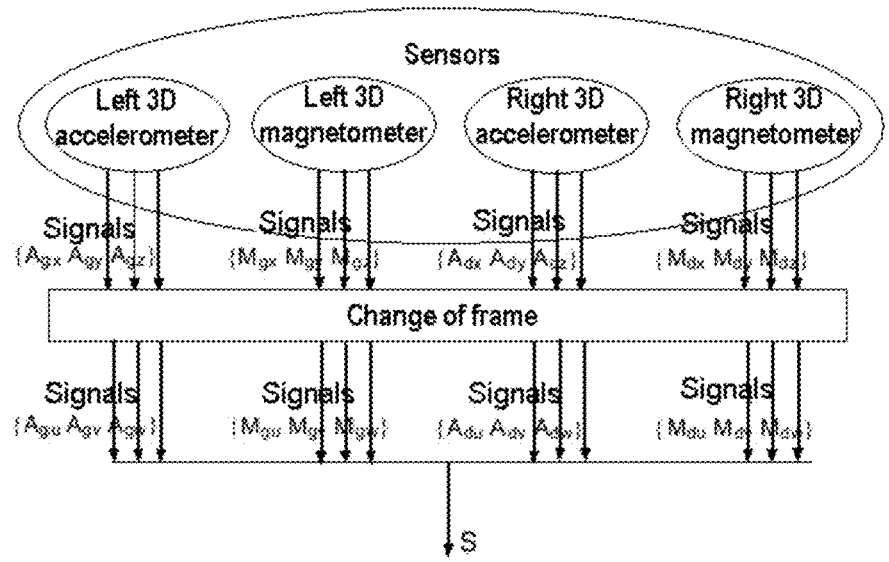

This configuration responds to a specific positioning of the sensor, for example on the side of the foot so as to orient one of the principal axes of a sensor in accordance with the movement, but it is conceivable to apply a processing to perform a change of frame (U, V, W), so as to position the sensors in one and the same frame. This change of frame also makes it possible to ascertain the principal direction or the principal plane of the movement, as illustrated in FIG. 5.

Stated otherwise, a change of frame of the signals in a first orthonormal frame (X, Y, Z) is performed by using a decomposition into decreasing eigenvalues $\lambda_u$, $\lambda_v$ and $\lambda_W$ to express the first orthonormal frame (X, Y, Z) in a second orthonormal frame (U, V, W), whose axis U or whose axes U and V correspond respectively to a principal axis or a principal plane of said movement.

The signal having to contain a maximum of information in regard to the movement performed, the axis of the sensor from which the signal is extracted is oriented in an optimal manner with respect to the movement.

Either the sensor is positioned in an optimal manner, for example so that the X axis of the sensor measures the component of the signal comprising the most information, with the best signal/noise ratio, or a change of frame may be performed.

To perform this change of frame from the basis (X, Y, Z) to (U, V, W), an eigenvalue decomposition is used. The principle consists in determining coefficients $\lambda_u$, $\lambda_v$ and $\lambda_w$, such that $\lambda_u > \lambda_v > \lambda_w$. The basis of the sensor can thus be described as a combination of the various axes (U, V, W) which form an orthonormal frame. One of the properties of the decomposition makes it possible to define this new frame such that the U axis is the principal axis of the movement.

For example, for a given foot, the 3 sensor signals, for example arising from the accelerometer A: [Ax, Ay, Az], are considered over a window.

The correlation matrix C is be calculated thereafter:

$$C = \begin{bmatrix} c(Ax, Ax) & c(Ax, Ay) & c(Ax, Az) \\ c(Ay, Ax) & c(Ay, Ay) & c(Ay, Az) \\ c(Az, Ax) & c(Az, Ay) & c(Az, Az) \end{bmatrix},$$

with c(A,B) the inter-correlation function for A and B.

According to the principle of Principal Component Analysis or PCA, the coefficients $\lambda_u$, $\lambda_v$ and $\lambda_W$ are defined by the following relations:

$$L = \begin{bmatrix} \lambda_u & 0 & 0 \\ 0 & \lambda_v & 0 \\ 0 & 0 & \lambda_w \end{bmatrix},$$

and $D = P^{-1}CP$; with P the switching matrix which thus defines the new frame, that is to say the matrix which makes it possible to modify the signals so as to adapt them within the new frame. The decomposition into eigenvalues makes it possible to determine the switching matrix P, as well as the matrix L.

Thus, to apply the processing operations, it is possible to consider the signal of the accelerometer $A_u$, rather than $A_x$.

For such an example, to simulate walking/running, the system considers that the player performs walking/running movements, either when his feet leave the ground, or with the tips of his toes on the ground. In the subsequent, nonlimiting, description, it is to this example that various embodiments of the invention are applied.

The period makes it possible to define the frequency or speed of the player's paces, that is to say to determine whether the player is walking slowly or quickly or whether he is running. The duration of the paces may be estimated with an inter-correlation function for two signals S1 and S2. The idea is to estimate the time shift between the two signals which maximizes their correlations, this shift $\tau_{opt}$ being related thereafter to the period T of the player's paces. Various configurations of increasing complexity may be envisaged:

S1=S2=Agx or Adx or Agu or Adu i.e. an autocorrelation on a component of an arbitrarily chosen foot and if possible oriented along the principal movement axis. In this case, $\tau_{opt}$=T, S1=Agx and S2=Adx, or Agu or Adu i.e. a correlation between two like components of the two feet. In this case the two axes may have the same direction and the same sense. In this case, $\tau_{opt}$=T/2, In the previous case, it is possible to be certain of the collinearity of the axes by carrying out an estimation of the principal axis of the movement on each foot by a technique of eigenvalue decomposition of the signal.

To allow the tracking of the variations in the period of the player's paces, the calculation of the correlation relies on a window of the signal which considers in a causal manner, or stated otherwise which takes into account, a time window using only samples preceding the instant of interest, the signal as well as the latest samples acquired. In order to determine the period of the signal, at least one period of may be used.

We have the following equation for the correlation $\Gamma_{s1s2}(t, \tau)$ between two signals S1 and S2:

$$\Gamma_{S1S2}(t, \tau) = \int_{\theta \in It} S1(\theta) \cdot S2(\theta - \tau) d\theta$$

in which:
t represents the current instant,
$\tau$ represents the shift considered,
It represents the interval dependent on t.
This function may be estimated by:

$$\Gamma_{S1S2}(t, \tau) = \sum_{\theta=0}^{T_f - \tau - 1} S1(t - \theta) \cdot S2(t - \theta - \tau)$$

$T_f$ representing the size of the time window of interest and therefore defining the span of variation of the delay $\tau$ as [0; Tf[.

In order to favor the latest samples acquired and to improve the quality of the estimation, it is possible to add within this calculation a weighting window $w_{T_f-\tau}$, of duration $T_f$-$\tau$ which thus makes it possible to apply to each window of the signal a certain weight proportional to the instant of the window and the instant of the sample. The correlation function can then be calculated through the following relation:

$$\Gamma_{S1S2}(t, \tau) = \frac{1}{\sum_{\alpha=0}^{T_f - \tau - 1} w_{T_f - \tau}(\alpha)^2} \times \sum_{\theta=0}^{T_f - \tau - 1} S1(t - \theta) \cdot S2(t - \theta - \tau) w_{T_f - \tau}^2(\theta)$$

in which $\alpha$ represents a temporal index of the weighting window.

Figure 6:
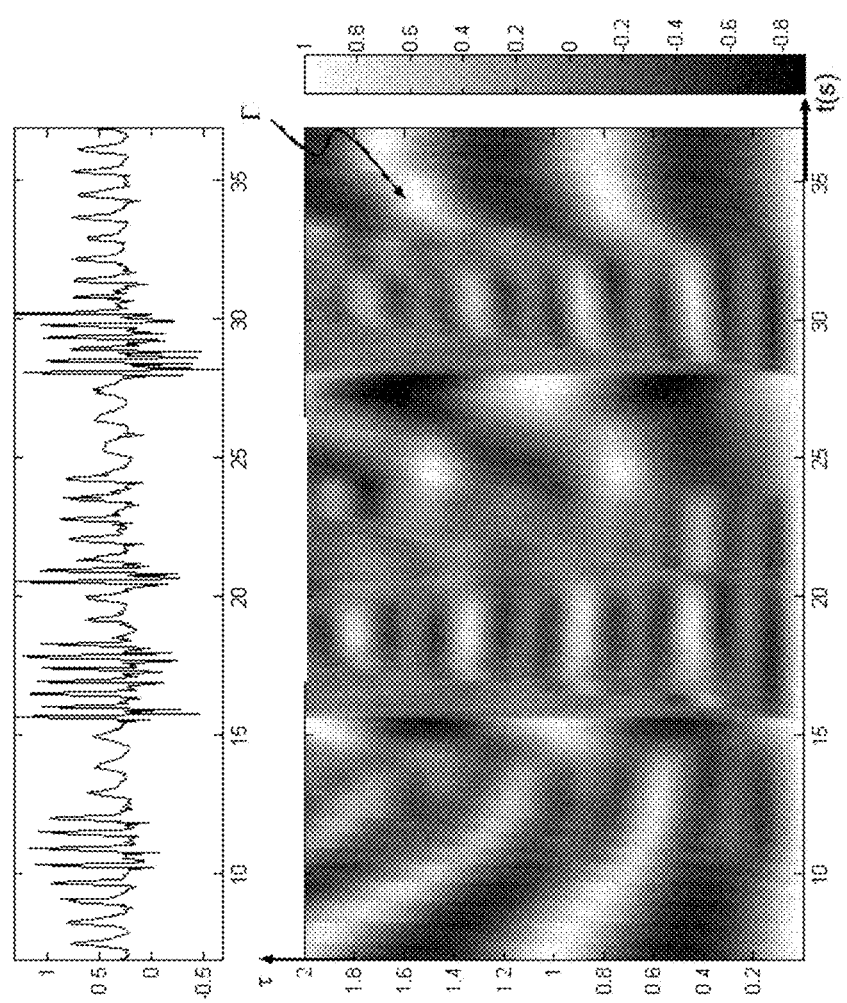
FIGS. 6 and 7 schematically illustrate a problem of determining the period.

The correlation makes it possible to determine, when the latter is a maximum, the optimal shift corresponding to the period of the signal. FIG. 6 represents the correlation function as a function of t and of $\tau$ for a signal whose period varies.

Figure 7:
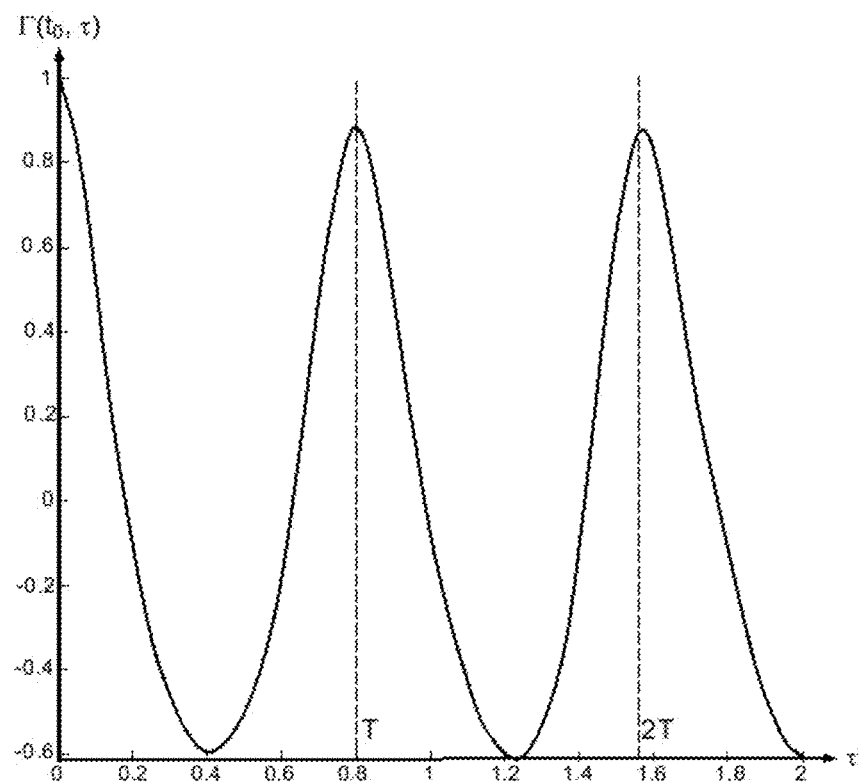

FIG. 7 is a section through FIG. 6 at a given instant t=35 s. These two figures involve the case S1=S2=Agx or Adx with an autocorrelation on a component of a foot. Thereafter, the maximum may be tracked so as to correct any errors at a given instant.

This step thus makes it possible to facilitate the search for the maximum correlation value by removing the secondary values, multiples of the period, by virtue of the suitably adapted size of the sliding window.

The result of period corresponding to the duration of a pace is therefore the value T determined by the maximum of the correlation:

$$T = \max_{\tau}(\Gamma(t, \tau))$$

This scheme therefore uses a single parameter: $\tau_{max}(T_f)$ corresponding to the maximum shift that is considered for the calculation of the correlation. This shift may be interpreted as the maximum possible delay for a time window of this size.

When using a fixed parameter, the delay will be constant, but if the rate accelerates, it is not possible to respond at the earliest possible moment. Accordingly, the maximum size of the window may be adjusted as a function of the slowest pace, i.e. several seconds. Thus the idea is to have an adaptive adjustment of the size of the analysis window so as to optimize the speediness of the system upon a change of walking rate.

Stated otherwise, as shown by FIG. 7, the result of the correlation Γ exhibits several lobes, each maximum of which is located at T, 2T, 3T, . . . , kT in the case of the autocorrelation (respectively T/2, 3T/2, 5T/2, . . . , (2k+1)T/2 in the case of the correlation between the two feet). In the ideal case of a perfectly stationary signal, the lobe whose maximum is the global maximum is situated at T (respectively T/2). However, in the case of a signal whose period is non-stationary, the global maximum might not be situated at T (respectively T/2), but at 2T or 3T (respectively 3T/2, 5T/2).

In this case, the result given for the estimation of the period would therefore be wrong, and the estimated period would be two or three times greater than the real value. Hence, a correction is afforded as follows:

Let T be the instant of the global maximum.

If there exists a lobe whose maximum is close to the value of the maximum at the instant T/2 or T/3, or T/4 . . . then the instant T is corrected as T/2 or T/3 or T/4, that is to say the largest possible denominator (respectively 2T/5, 2T/3, . . . ).

A second check is possible, so as to validate the temporal continuity. The principle consists in validating the value of T, by comparing it with values which are determined over the latest windows. If the value varies too much, then we wait for the acquisition of a new sample. According to the value of T on the following window, which is either close to the values on the preceding windows, or close to T on the current window. In the latter case, there has been a change of rate and a good value of T has been found, otherwise, the movement has not varied and the estimation of T over the current window is false, and may be replaced with the average of T over the previous window and the following window.

According to various embodiments of the invention, a step of predetermining the size of the sliding window is added, which is based on a simple and approximate estimation of the period of the signal.

For this simple and rapid estimation, it is for example possible to implement the estimation of Makarov, cited above, which makes it possible to define in a causal manner, i.e. using only samples from the past, a value scale for the period of the signal.

A Marakov estimation makes it possible to determine the frequency of a non-stationary signal, at each instant, by considering the latest samples acquired. The principle relies on the statistics of trends. For each point of the signal, it is possible to estimate whether the trend is modified, that is to say whether the maximum and minimum values observed at the previous instant are retained. If this trend is modified, then the point is not an extremum, otherwise it is an extremum. Thus, it is possible to ascertain at each instant the instant corresponding to the previous extremum, which may be converted, knowing the sampling frequency, into an estimated period or frequency.

The algorithm is of reduced complexity and is therefore perfectly adapted to a prior determination of the period of the signal. On the basis of this estimation, it is indeed possible to determine in an optimal manner the size of the sliding window on which the processing operations for estimating the parameters are subsequently performed. It is indeed more relevant to consider only the latest periods of the signal which correspond to the movement in progress, rather than to consider signals describing a past and completed movement which would disturb the calculations.

For example, the signals arising from the magnetometers are used as input for the first estimation module EST1 since they comprise fewer lobes. This Marakov estimation simply considers the changes of trend of the signal by evaluating the presence of extrema. For each point, it is possible to determine the distance from the closest past extremum. Thus on the appearance of a new extremum it is possible to estimate the period by virtue of the distance from the previous extremum.

A second parameter that may be estimated is the amplitude, that is to say the length of a pace. Likewise, it is possible to extract the size of the sliding window containing the signal of the pace performed, either by using the result of the precise correlation of the second estimation module EST2, or on the basis of the Makarov result of the first rapid estimation of the first estimation module EST1.

The amplitude is determined with the aid of the signals arising from the magnetometers and corresponds to the absolute value of the difference of the maximum and of the minimum of the sum of the signals:

$$A(t) = \left| \max_{i \in [t-T,t]} S(i) - \min_{i \in [t-T,t]} S(i) \right|$$

S being the sum of the signals of the magnetometers of the right foot or of the left foot:

$S(t)=M_x(t)+M_y(t)+M_z(t)$ or $S(t)=M_u(t)+M_v(t)+M_w(t)$ in the case of a change of frame.

A third parameter may be the impact, that is to say the power of the shock between the heel and the ground. This value is linked directly to the acceleration of the sensor and therefore proportional to these values.

It is considered that the result corresponds to the maximum value of the acceleration during the pace performed. Just as for the amplitude, it is therefore possible to extract the window of the signal corresponding to the pace performed, either with the aid of the result of the precise correlation of the second estimation module EST2, or on the basis of the Makarov result of the first rapid estimation of the first estimation module EST1.

The calculation is simply performed as being the norm of the acceleration signals:

$$I(t) = \max_{i \in [t-T,t]} \|A(i)\| = \max_{i \in [t-T,t]} \sqrt{A_x(t)^2 + A_y(t)^2 + A_z(t)^2}$$

Another characteristic of the movement may be the orientation. Accordingly, the signals of the magnetometers are used, by considering most naturally the orientation of the player with respect to magnetic North.

The correlation calculation involves a weighting window. The form of the weighting may be chosen. However, the form has little influence on performance since the window accords greater significance to the most recent samples.

Finally, depending on the position of the sensor, it may be beneficial to indicate the principal axis of orientation of the sensors so as to use only two signals (for example left foot and right foot along the X axis) for the calculation of the correlation.

It is also possible to apply a change of frame so as to determine the principal axis of the movement and consequently to automatically determine the principal axis to be considered, but this calculation may lead to additional complexity. Here again, experiments have highlighted that the use of the same X axis, when the sensor is positioned on the side of the foot, makes it possible to provide good results, while retaining good robustness.

Figure 8:
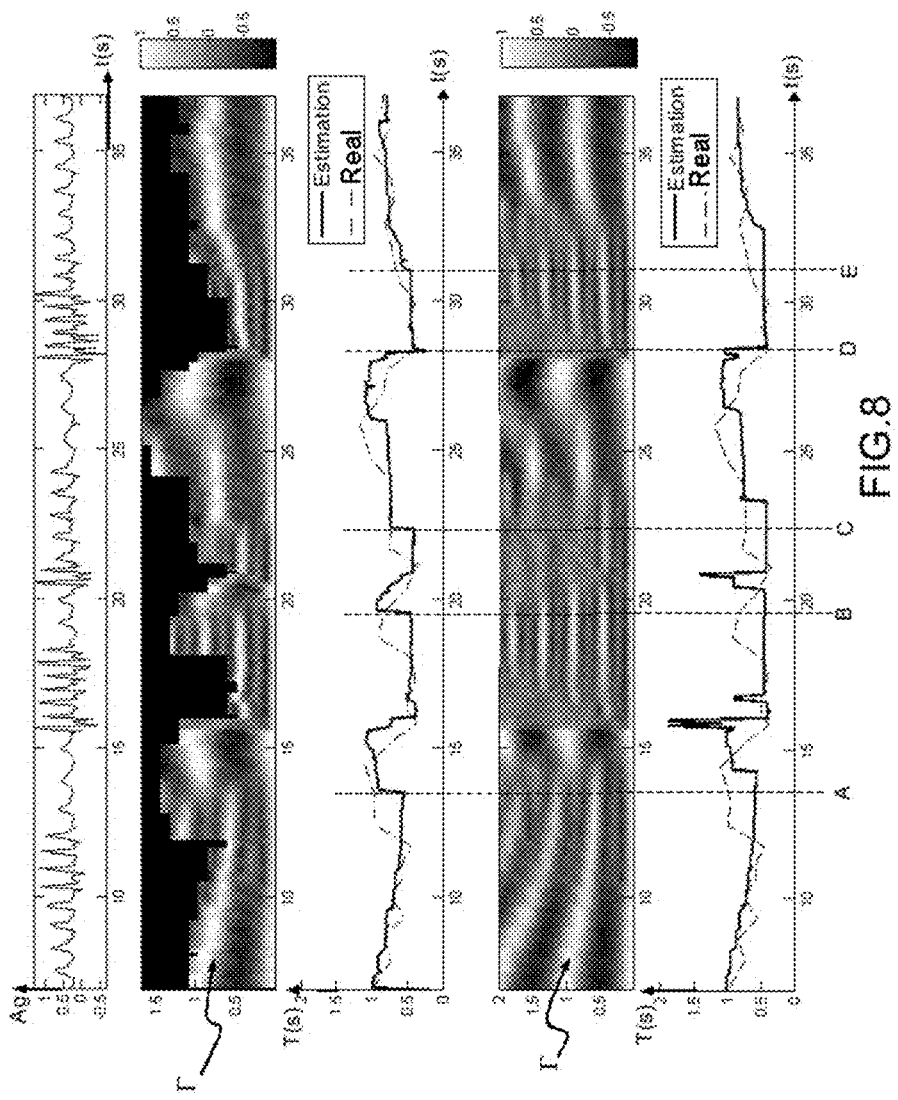
FIG. 8 schematically represents an exemplary comparison of the calculation of the period according to various embodiments of the invention with an estimation with a window of optimized size.

In order to illustrate the benefit of predetermining the walking frequency, FIG. 8 represents the results for the determination of the period or duration of the paces by using an adaptive or non-adaptive window.

The signals, represented from top to bottom, are:
the signal of acceleration along the X axis transmitted by the accelerometer linked to a foot;
the correlation function as a function of the time t and of the shift t for a variable window size. The black zone at the top of the image is linked to the size of the window adjusted in an adaptive manner. It varies, in this example, between 0.5 seconds and 1.7 seconds;
the period estimated in an adaptive manner according to various embodiments of the invention, in comparison to the real value;
the correlation function as a function of the time t and of the shift τ for a fixed window size; and
the period estimated with a window of fixed size of 2 seconds, in comparison to the real value.

Thus at the instants A, B and C, at which a transition from rapid walking to slow walking takes place, the adaptive approach represented in the second graph responds more rapidly than in the case, represented in the third graph, of a window of fixed size. The instant D corresponds to a transition from slow walking to rapid walking for which the difference is more subtle on account of the signal itself but the reactivity is nevertheless improved. The instant E is interesting since it shows that during a gentler transition between two walking speeds is more gradual with an adaptive approach.

Various embodiments of the present invention are particularly beneficial for improving the real-time aspect, as well as, in the case of video gaming, for improving the robustness of the system in relation to the various ways of playing.

What is claimed is:

1. A system for real-time determination of a parameter of a movement having a repetitive form, comprising:
first estimating means for estimating an approximation of a period of said movement having a repetitive form, before an end of a current movement, on a basis of representative signals indicative of said movement;
determining means for determining a size of a sliding window on a basis of said period estimated by said first estimating means; and
second estimating means for precisely estimating, by said sliding window, said movement parameter, on said basis of representative signals indicative of said movement and of said size of sliding window delivered by said first estimating means.

2. The system of claim 1, wherein said movement parameter is the period of said movement having a repetitive form.

3. The system of claim 2, wherein said second estimating means comprises a correlation-based calculation means.

4. The system of claim 2, wherein a third estimating means for estimating another movement parameter of said movement having a repetitive form, different from said period, comprises said second estimating means for precisely estimating said period.

5. The system of claim 1, wherein said determining means comprises a multiplicative factor for a safety margin.

6. The system of 1, further comprising a communication interface for communicating in real time an evolution of said movement to a user.

7. The system of claim 6, wherein said communication interface comprises an audiovisual interface.

8. The system of claim 1, further comprising a sensor assembly configured to connect to an element performing the movement having a repetitive form, so as to deliver at least the representative signals.

9. The system of claim 8, wherein said sensor assembly includes at least one magnetometer accelerometer, gyrometer, pressure sensor, electrocardiograph, flowmeter for measuring breath, or a sensor for measuring respiration.

10. A method for real-time determination of a parameter of a movement having a repetitive form, comprising:
utilizing a sensor assembly coupled to an element performing the movement having a repetitive form to obtain at least signals representative of the movement;
estimating an approximation of a period of said movement, before an end of a current movement, on the basis of the representative signals;
determining a size of a sliding window on a basis of said approximation; and
estimating precisely, by the sliding window, said parameter, on the basis of at least one representative signal indicative of said movement and of said determined size of the sliding window.

11. The method of claim 10, further comprising determining the precise period of said movement having a repetitive form in real time.

12. The method of claim 11, further comprising estimating another movement parameter of said movement having a repetitive form by precisely estimating the period of said movement.

13. The method of claim 10, wherein said signals transmitted by the sensor assembly originate from at least one magnetometer, accelerometer, gyrometer, pressure sensor, electrocardiograph, flowmeter for measuring breath, or sensor for measuring respiration.

14. The method of claim 10, wherein a change of a frame of said signals transmitted by the sensor assembly furnished with a first orthonormal frame is performed by using a decomposition into decreasing eigenvalues to express said first orthonormal frame in a second orthonormal frame, whose at least one axis corresponds to at least a principal axis of said movement.

15. The method of claim 11, further comprising:
detecting local maxima and a global maximum, over said sliding window, said local and global maxima being multiples of an elementary duration; and
selecting the maximum occurring earliest and whose deviation with respect to said global maximum is less than a threshold.

\* \* \* \* \*